United States Patent
Neal

(10) Patent No.: US 8,419,510 B2
(45) Date of Patent: Apr. 16, 2013

(54) POULTRY DEBONING KNIFE

(75) Inventor: Scott Neal, Sturbridge, MA (US)

(73) Assignee: Dexter-Russell, Inc., Southbridge, MA (US)

( * ) Notice: Subject to any disclaimer, the term of this patent is extended or adjusted under 35 U.S.C. 154(b) by 742 days.

(21) Appl. No.: 12/538,233

(22) Filed: Aug. 10, 2009

(65) Prior Publication Data

US 2011/0034117 A1 Feb. 10, 2011

(51) Int. Cl.
*A22C 17/00* (2006.01)

(52) U.S. Cl.
USPC .......................................... 452/135

(58) Field of Classification Search ............... 452/6, 12, 452/13, 16, 102–106; 7/122, 143–147, 158, 7/161, 166; 30/304, 305, 114, 280, 278, 30/279 R See application file for complete search history.

(56) References Cited

U.S. PATENT DOCUMENTS

| | | | |
|---|---|---|---|
| 4,290,201 A * | 9/1981 | Goodwin | 30/294 |
| 4,825,552 A | 5/1989 | Bendickson et al. | |
| 4,920,612 A | 5/1990 | Moore | |
| 5,033,987 A | 7/1991 | Bloch | |
| 5,086,561 A | 2/1992 | Nathan | |
| 5,692,308 A | 12/1997 | Di Libero | |
| 6,745,477 B2 * | 6/2004 | Gray | 30/304 |
| 6,935,941 B1 * | 8/2005 | Muehlenbeck | 452/103 |
| 7,214,127 B1 * | 5/2007 | Thompson et al. | 452/103 |
| 7,578,731 B1 * | 8/2009 | Moore | 452/103 |
| 7,909,683 B1 * | 3/2011 | Waltman | 452/149 |
| 8,021,216 B1 * | 9/2011 | Moore | 452/103 |
| 8,066,557 B2 * | 11/2011 | Tarrant | 452/107 |
| 2007/0204471 A1 | 9/2007 | Castagna | |

* cited by examiner

*Primary Examiner* — Richard Price, Jr.
(74) *Attorney, Agent, or Firm* — Lackenbach Seigel, LLP

(57) ABSTRACT

A safety use deboning knife includes a blade having a distally disposed carcass flesh penetration tip disposed immediately adjacent the blade curved cutting edge and spacedly disposed from the blade non-cutting upper edge by a planar distal edge, which distal edge subtends an acute angle of less than about 45° and preferably in less than about 25° with entire cutting portion disposed below the blade center line.

16 Claims, 4 Drawing Sheets

POULTRY DEBONING KNIFE

BACKGROUND OF INVENTION

1. Field of the Invention

This invention relates to knives and knife blades. The invention more specifically relates to knifes and knife blades for deboning poultry. This invention further relates to method for deboning poultry.

2. Background and Discussion of the Prior Art

In general, knives had blades of diverse configurations for different applications. U.S. Pat. No. 4,920,612, granted May 1, 1990 to Moore and U.S. Pat. No. 4,825,552, granted May 2, 1989 to Bendickson et al. disclose fish fillet knifes. U.S. Pat. No. 5,033,987 granted, Jul. 23, 1991 to Bloch discloses skinning and cutting knife, U.S. Pat. No. 5,692,308, granted Dec. 2, 1997 to Di Libero discloses a chef's knife. US 2007/0204471 A1, published Sep. 6, 2007 to Castagna disclose a knife with a series of interchangeable and disposable blades. U.S. Pat. No. 5,086,561, granted Feb. 11, 1992 to Nathan discloses the combination of a safety knife having serrations for safety in combination with a safety garment for use in poultry processing operations.

In the field related specifically to poultry deboning, it was generally known to provide a series of knives for stepwise deboning operations. Each such deboning knife had a most distally disposed flesh penetration tip disposed adjacent the upper edge of the knife blade. FIG. 1 shows one embodiment of a prior art poultry deboning knife 1. Knife 1 has a handle 2 and blade 3. Blade 3 has an upper non-cutting edge 4 and a lower cutting curved cutting edge 5. A flesh penetration tip 6 is distally disposed immediately adjacent upper edge 4. FIG. 3 shows a second prior art poultry deboning knife 7. Knife 7 is used alone or alternatively in a stepwise manner with knife 1. Knife 7, likewise, has a flesh penetration tip 8 distally disposed and immediately adjacent upper non-cutting edge 9.

In the aforesaid manner of construction, the prior art poultry knives would readily penetrate the flesh to a prescribed limited depth by and at respective the penetration tip 6 or 8, and then the user in a facile motion would readily rotate the blade to readily assert a leverage force for each deboning operation.

In such prior art deboning operations, the operator would generally use a cloth or polymeric material glove for protection. The flesh penetration tip would, however, readily puncture the glove and flesh of the operator. This caused serious injury and labor issues, as well as interruption and disruption in the operations, with concomitant adverse costs associated with employee and production issues. The industry then went to metal chain-linked gloves. While the metal gloves prevented such further injuries, the operator would be readily fatigued with concomitant losses in productivity as well as hand and wrist impairment.

The poultry deboning art desired knives that were readily used by operators with a light, flexible cloth or polymeric gloves, while minimizing the prospect of puncture to the glove and to the flesh of the user, while still permitting high-volume accurate poultry deboning operations.

It is therefore a principal object of the present invention to provide a knife for improved poultry deboning.

It is another principal object of the present invention to provide a knife as aforesaid with improved safety in high volume poultry deboning.

It is still another object of the present invention to provide a series of knives as aforesaid for stepwise deboning operations.

It is yet a further object of the present invention to provide knives as aforesaid of practical design and construction.

The aforesaid art needs and objects are achieved by knives of the present invention.

SUMMARY OF THE INVENTION

The deboning knife has a blade with a carcass flesh penetration tip which is distally disposed adjacent the curved lower portion of the blade cutting edge and spacedly disposed from the blade upper non-cutting edge. An angularly disposed planar distal edge is disposed between the penetration tip and the upper edge. The distal edge subtends an acute angle of less than about 45°, and in a preferred embodiment less than about 20° with the entire cutting edge disposed below the blade center line. The user penetrates the carcass flesh and readily applies leverage to effect the deboning operation without cutting the user. A series of knives of the present invention provide safe sequential deboning operations in a stepwise manner debone a carcass, particularly a poultry carcass.

DESCRIPTION OF THE INVENTION

Figure 1:
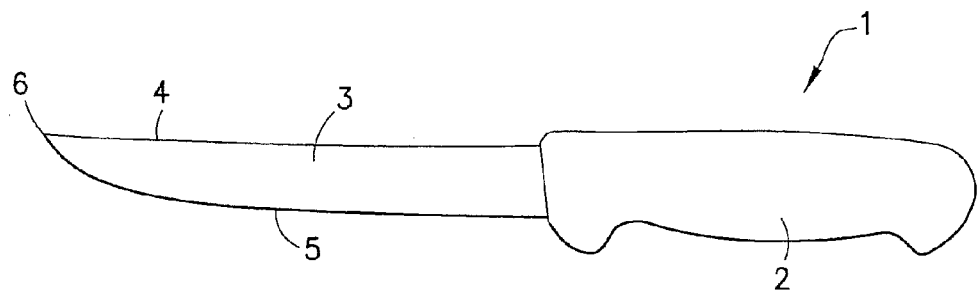
FIG. 1 is a side view of a PRIOR ART deboning knife.
Figure 2:
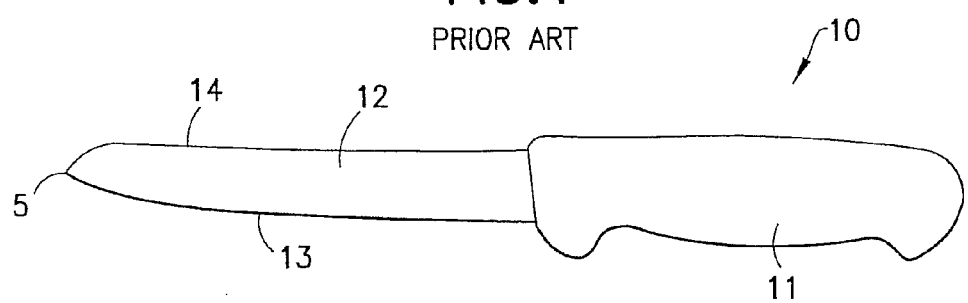
FIG. 2 is a side view of a deboning knife of the present invention for the deboning operation of the knife as show in FIG. 1.
Figure 3:
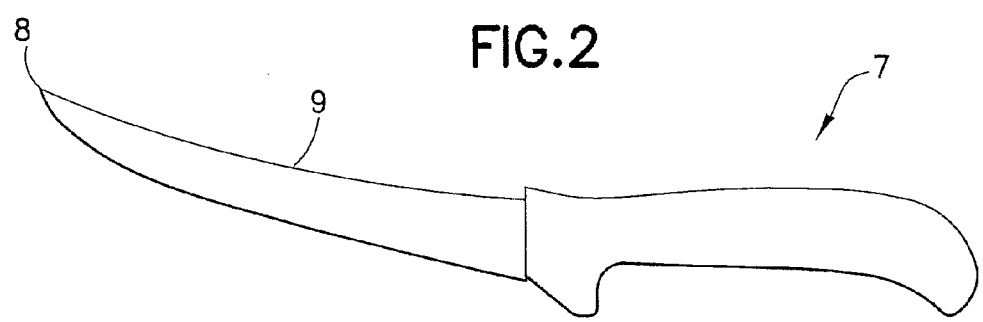
FIG. 3 is a side view of a second PRIOR ART deboning knife.

Referring to FIG. 2, there is shown poultry deboning knife 10 of the present invention. Knife 10 has handle 11, and blade 12 having lower cutting edge 13 and upper non-cutting edge 14. A flesh penetration tip 15 is spacedly downwardly disposed from non-cutting edge 14, and disposed immediately adjacent cutting edge 13, for purposes hereinafter appearing. Knife 10 is an improvement over knife 1 (FIG. 1), and replaces knife 1 in a poultry deboning operation.

Figure 4:
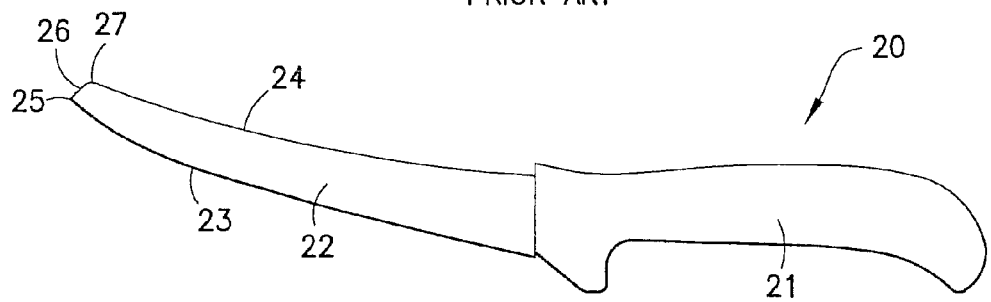
FIG. 4 is a side view of a second deboning knife of the present invention for the deboning operation of the knife of FIG. 3.
Figure 12:
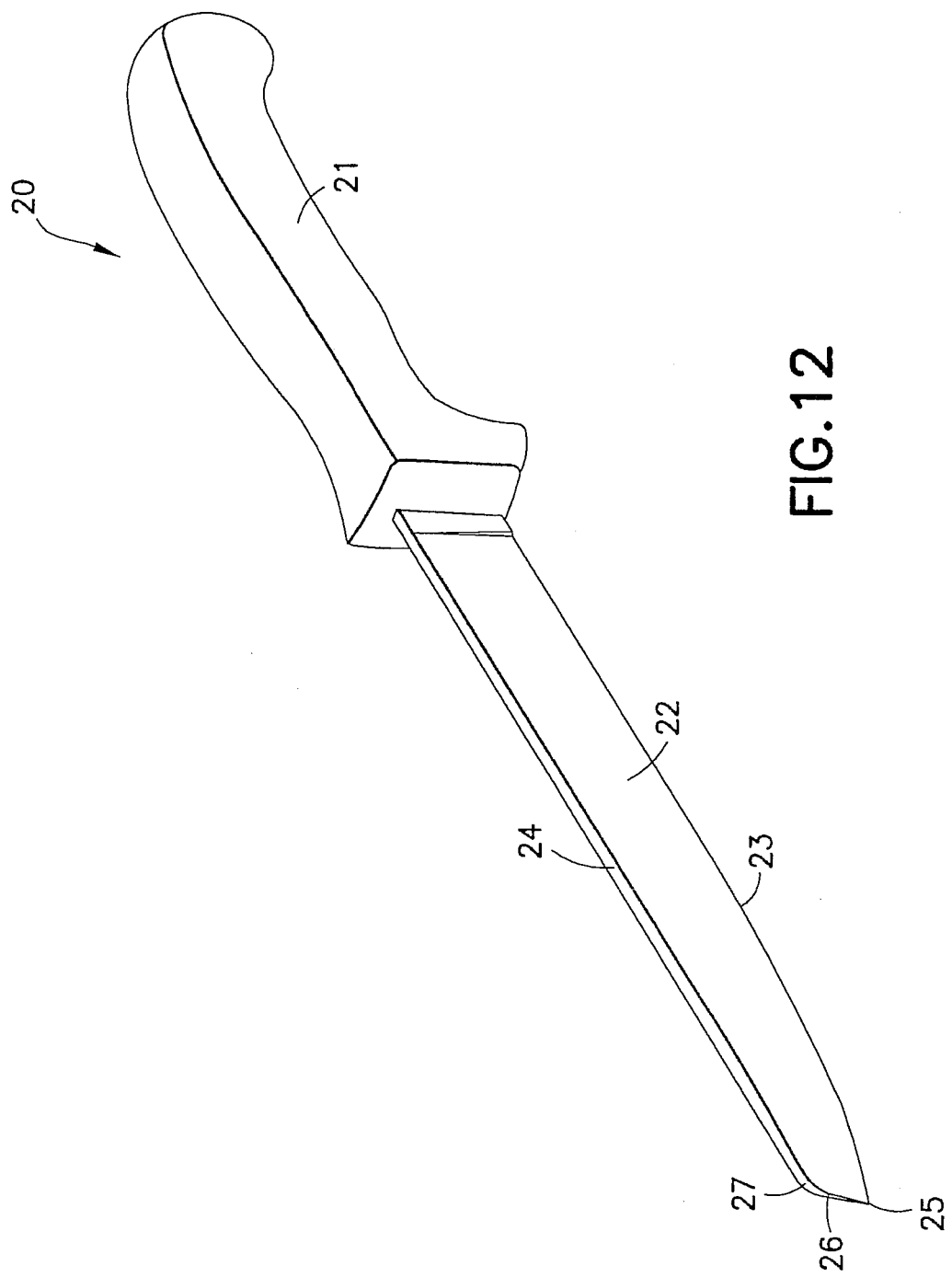
FIG. 12 is a distal end perspective view of the knife as shown in FIG. 9.

Referring to FIGS. 4 and 12, three is shown poultry deboning knife 20 of the present invention. Knife 20 has handle 21 and blade 22 having lower cutting edge 23 and upper non-cutting edge 24. A flesh penetration tip 25 is spacedly downwardly disposed from upper non-cutting edge 24 and immediately adjacent cutting edge 23, for purposes hereinafter appearing. A planar angularly disposed edge 26 and rounded corner 27 are disposed between penetration tip 25 and upper non-cutting edge 24. Knife 20 is an improvement over knife 7, and replaces knife 7 in a poultry deboning operation.

Referring to FIGS. 5-11, there is shown a series of poultry deboning blades 30, 40, 50, 60, 70, 80, and 90 which further illustrate the present invention. Each blade 30, 40, 50, 60, 70, 80 and 90 performs one specific deboning step in fully deboning poultry.

Figure 5:
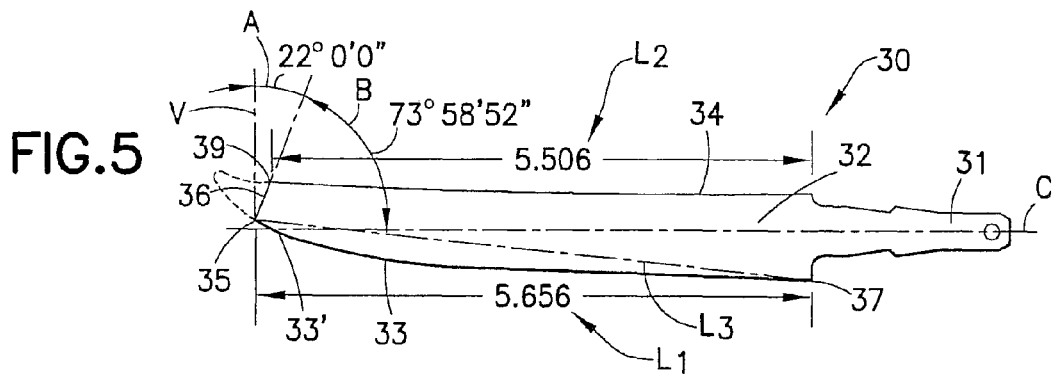
FIG. 5 is a side view of a first embodiment of the knife blade of the present invention.
Figure 6:
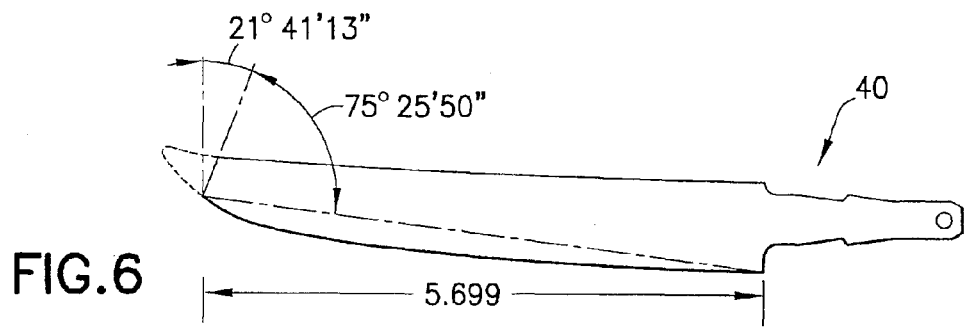
FIG. 6 is a side view of a second embodiment of the knife blade of the present invention.
Figure 7:
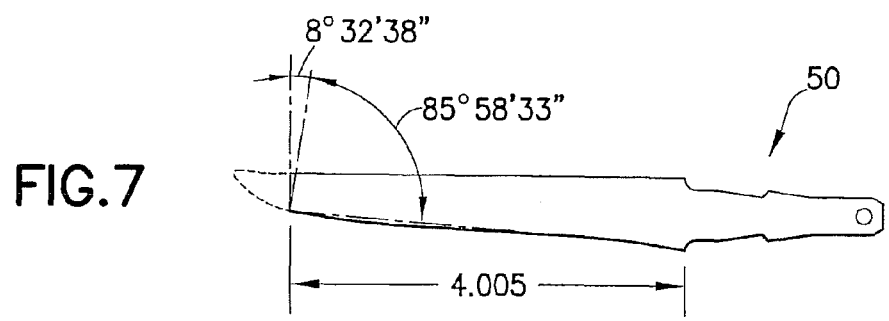
FIG. 7 is a side view of a third embodiment of the knife blade of the present invention.
Figure 8:
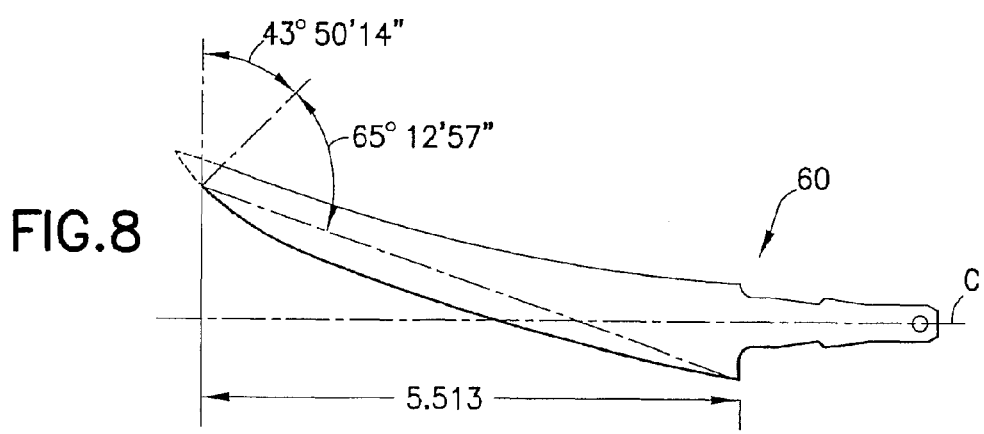
FIG. 8 is a side view of a fourth embodiment of the knife blade of the present invention.
Figure 9:
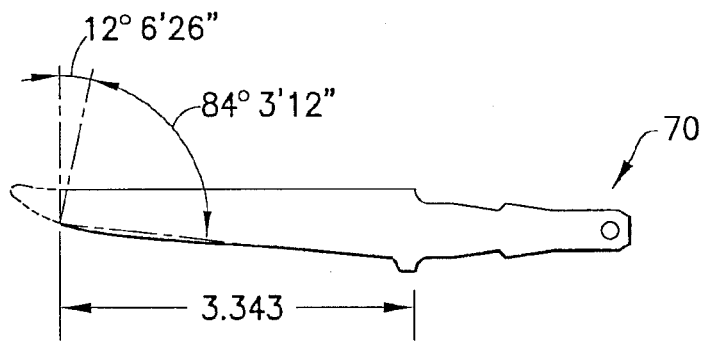
FIG. 9 is a side view of a fifth embodiment of the knife blade of the present invention.
Figure 10:
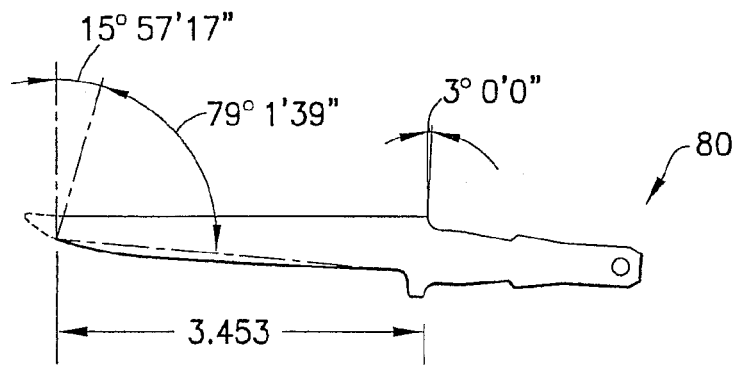
FIG. 10 is a side view of a sixth embodiment of the knife blade of the present invention.
Figure 11:
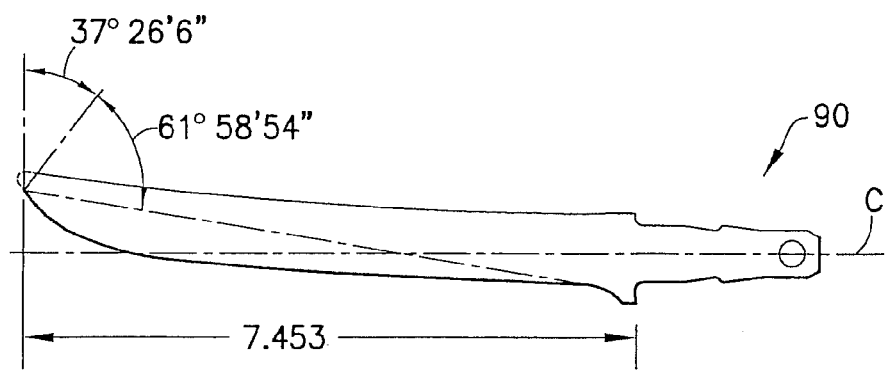
FIG. 11 is a side view of a seventh embodiment of the knife blade of the present invention.

Referring specifically to FIG. 5, there is shown a series of angular and related dimensions that, in one aspect, further illustrate the invention. Blade 30 includes proximately disposed tang 31 and distal disposed operating blade portion 32. Blade portion 32 includes lower cutting edge 33 with covered cutting portion 33' and upper non-cutting edge 34. Flesh penetration tip 35 is spacedly downwardly disposed from non-cutting edge 34. A planar V-shaped (in distal end view) edge 36 is disposed between edge 33 and edge 34. The length of the cutting edge $L_1$ is measured for the proximate end point 37 of cutting edge 33 to the flesh penetration tip 35. $L_1$ for blade 30 is 5.656 inches. The length of the non-cutting edge 34 is measured from the proximate end 38 of edge 34 to upper corner 39. The length $L_2$ of the non-cutting edge for blade 30 is 5.506 inches. The angular disposition A of the angularly disposed planar edge is measured from the vertical line V to the planar surface of edge 36. The angle A is 22° 0' 0" for blade 30. A related angular disposition B of planar edge 36 is measured from the planar surface of edge 36 to line $L_3$ which extends from penetration tip 35 to end point 37. A blade center line C is shown and drawn through the center of the blade tang and perpendicular to line V.

Referring to FIGS. 5-11, there is shown a distal end broken line construction for each respective blade. The broken line construction represents the prior art distal end blade configuration for each respective knife of the present invention that replaces the prior art construction.

It is important to note that in each prior art construction the flesh penetration tip is disposed upwardly and immediately adjacent the upper blade edge, whereas in the present invention the flesh penetration tip is spacedly downwardly disposed from the upper non-cutting blade. It is also important to note that the penetration tip of the present invention is less distally disposed from the penetration tip of the respective prior art knife, and yet improved deboning operation is in effect by the knife of the present invention.

The improvements by the deboning knives of the present invention are achieved with blades having the respective measurements and angular relationship as shown in Table 1.

TABLE 1

| Blade | $L_1$ | A | B |
| --- | --- | --- | --- |
| 30 | 5.656 | 22° 0' 0" | 75° 57' 52" |
| 40 | 5.699 | 21° 41' 13" | 75° 25' 50" |
| 50 | 4.005 | 8° 32' 38" | 85° 58' 33" |
| 60 | 5.513 | 43° 50' 14" | 65° 12' 57" |
| 70 | 3.343 | 12° 6' 26" | 84° 3' 12" |
| 80 | 3.453 | 15° 57' 17" | 79° 1' 39" |
| 90 | 7.453 | 37° 20' 6" | 61° 58' 54" |

The angle A is an acute angle and from about 8" to 44°, and less than about 45°. Angle A is less than about 25° when the cutting edge curved position e.g. 33' is disposed below the center line C. See e.g. FIG. 5. Angle A is from about 28° to 45° when the cutting edge curved portion is disposed above the center line, see e.g. FIGS. 8 and 16.

The foregoing description illustrates a set of deboning knives and blades that provide improved deboning operations while avoiding puncturing the flesh of each operator in the respective deboning operation.

While the principles of this invention have been described in connection with specific embodiments, it should be understood clearly that these descriptions are made only by way of example and are not intended to limit the scope of the invention.

What is claimed is:

1. A method for deboning a carcass comprising:
(a) providing a set of deboning knives, each said deboning knife comprises:
a handle; a blade disposed in the handle, said blade comprises a proximate end and a distal end, and upper edge and a lower edge, said lower edge comprises a cutting edge comprising a curved portion; said distal end comprises a distal edge and a penetration tip, said penetration tip being disposed downwardly and distally from the upper edge, said blade has a longitudinally disposed center line and a vertically disposed distal end line in rectilinear disposition with the center line, and said distal edge defines a line in angular disposition with the distal end line, said distal edge angular disposition comprises an acute angle of less than about 45°; and
(b) piercing the flesh of the carcass with the penetration tip;
whereby the carcass flesh is penetrated by the penetration tip to a sufficient depth so that an effective leverage force is generated at the distal end while minimizing the prospect of cutting the operator's flesh.

2. The method of claim 1, wherein prior to step (b) for each said deboning knife, the method further comprises gripping the knife handle with a glove, said glove comprises substantially polymeric material.

3. The method of claim 2, said glove being free of metal mesh.

4. A method for deboning a carcass comprising:
(a) providing at least one deboning knife, said deboning knife comprises:
a handle; a blade disposed in the handle, said blade comprises a proximate end and a distal end, and upper edge and a lower edge, said lower edge comprises a cutting edge comprising a curved portion; said distal end comprises a distal edge and a penetration tip, said penetration tip being disposed downwardly and distally from the upper edge; and
(b) piercing the flesh of the carcass with the penetration tip;
said blade has a longitudinally disposed center line and a vertically disposed distal end line in rectilinear disposition with the center line, and said distal edge defines a line in angular disposition with the distal end line, said distal edge angular disposition comprises an angle of less than about 25°, and wherein the cutting edge curved portion is disposed below the center line;
whereby the carcass flesh is penetrated by the penetration tip to a sufficient depth so that an effective leverage force is generated at the distal end while minimizing the prospect of cutting the operator's flesh.

5. A method for deboning a carcass comprising:
(a) providing at least one deboning knife, said deboning knife comprises:
a handle; a blade disposed in the handle, said blade comprises a proximate end and a distal end, and upper edge and a lower edge, said lower edge comprises a cutting edge comprising a curved portion; said distal end comprises a distal edge and a penetration tip, said penetration tip being disposed downwardly and distally from the upper edge; and
(b) piercing the flesh of the carcass with the penetration tip;

said blade has a longitudinally disposed center line and a vertically disposed distal end line in rectilinear disposition with the center line, and said distal edge defines a line in angular disposition with the distal end line, said distal edge angular disposition comprises an angle of from about 25° to 45°, and wherein the cutting edge curved portion is disposed above the center line.

6. A method for deboning poultry comprising:
a) providing a set of deboning knives, each said deboning knife comprises:
a handle; a blade disposed in the handle, said blade comprises a proximate end and a distal end, and upper edge and a lower edge, said lower edge comprises a cutting edge comprising a curved portion; said distal end comprises a edge tip comprising a penetration tip, said penetration tip being disposed downwardly and distally from the upper edge;
(b) gripping the handle with a glove comprising substantially polymeric material;
(c) piercing the flesh of the poultry carcass with the penetration tip; and
(d) applying leverage force to the distal end; and
(e) wherein steps (a)-(d) are repeated for each said knife of the set of deboning knives;
whereby the poultry carcass flesh is penetrated by the penetration tip to a sufficient depth and an effective leverage force can be generated by the distal end while minimizing the prospect of cutting the operator's flesh.

7. The method of claim 6, wherein the glove is free of metal mesh.

8. The method of claim 6, wherein the penetration tip is disposed adjacent the cutting edge and spacedly disposed from the upper edge, for each one of the knives.

9. A deboning knife blade, said blade comprises an upper edge, a lower edge comprising an upwardly curved cutting edge, a distally disposed penetration tip disposed adjacent the lower edge, and a blunt edge disposed between the upper edge and the penetration tip, said blunt edge subtends an angle of from about 8° to 44° with the vertical V, and said angle is commensurate with increases proportionally with the extent of upward curvature in the cutting edge.

10. The deboning knife of claim 9, said blunt edge comprises a planar surface.

11. A set of deboning knife blades comprising a plurality of blades, each said blade comprises an upper edge, a lower edge comprising an upwardly curved cutting edge, a distally disposed penetration tip disposed adjacent the lower edge, and a blunt edge disposed between the upper edge and the penetration tip, said blunt edge subtends an angle of from about 8° to 44° with the vertical V, and said angle is commensurate with increases proportionally with the extent of upward curvature in the cutting edge.

12. The set of deboning knife blades of claim 11, wherein the set comprises from 2 to 7 knife blades.

13. A method for deboning poultry comprising:
a) providing a set comprising a plurality of deboning knives, each said deboning knife comprises:
a handle; a blade disposed in the handle, said blade comprises a proximate end and a distal end, and upper edge and a lower edge, said lower edge comprises a cutting edge comprising a curved portion; said distal end comprises a tip comprising a penetration tip, said penetration tip being disposed downwardly and distally from the upper edge;
(b) gripping the handle with a glove comprising substantially polymeric material;
(c) piercing the flesh of the poultry carcass with the penetration tip;
(d) applying leverage force to the distal end;
whereby the poultry carcass flesh is penetrated by the penetration tip to a sufficient depth and an effective leverage force can be generated by the distal end while minimizing the prospect of cutting the operator's flesh, each said blade curved portion comprises an upward curvature and a blunt edge disposed between the upper edge and the penetration tip, said blunt edge subtends an angle, and said angle is commensurate with and increases proportionally with the extent of upward curvature of the cutting edge.

14. The method of claim 13, wherein the set of deboning knives comprises from 2 to 7 knife blades.

15. The method of claim 13, wherein the angle for each blade in the set is from about 8° to 44° with the vertical V.

16. A deboning knife blade, said blade comprises an upper edge, a lower edge comprising an upwardly curved cutting edge, a distally disposed penetration tip disposed adjacent the lower edge, and a blunt edge comprises a planar surface disposed between the upper edge and the penetration tip, said blunt edge planar surface subtends an angle of from about 8° to 44° with the vertical V, and said angle is commensurate with and increases proportionally with the extent of upward curvature in the cutting edge.

* * * * *